Nov. 25, 1952  E. J. CHARLES  2,618,992
CIRCLE CUTTER
Filed Dec. 31, 1948
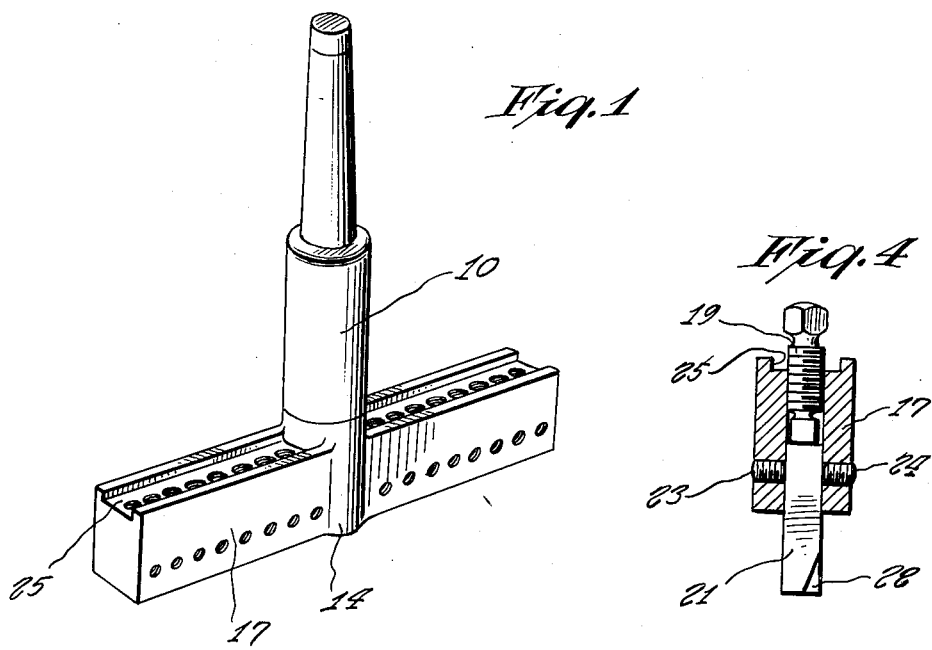
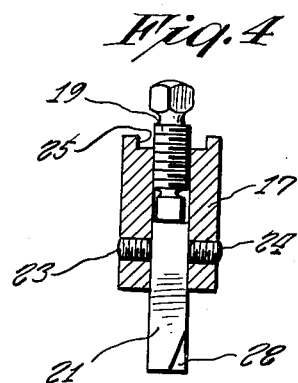
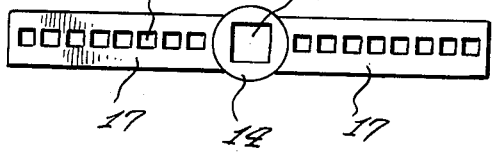
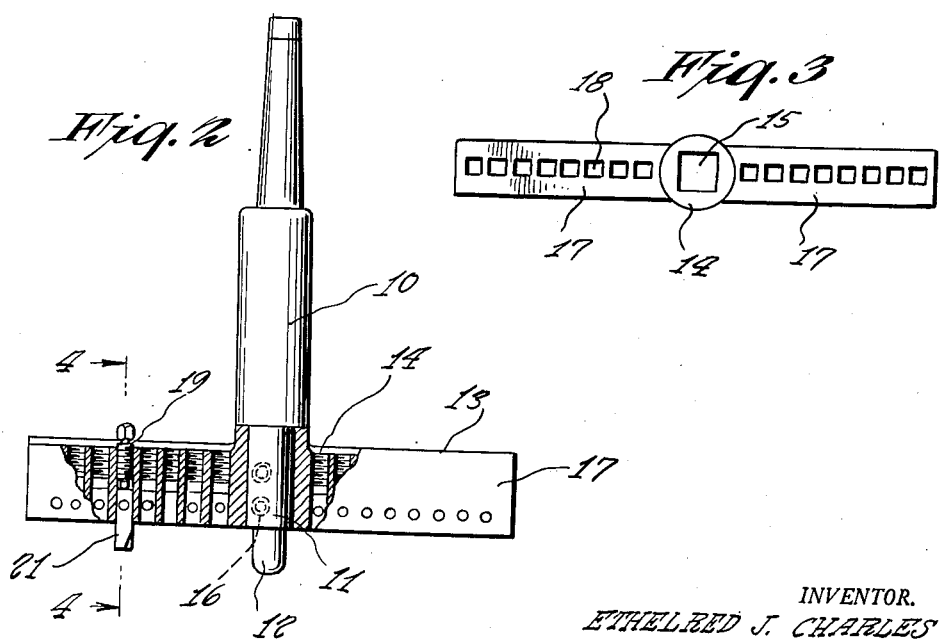
INVENTOR.
ETHELRED J. CHARLES
BY
Carl Miller
ATTORNEY Patented Nov. 25, 1952

2,618,992

UNITED STATES PATENT OFFICE 2,618,992

CIRCLE CUTTER

Ethelred J. Charles, Brooklyn, N. Y.

Application December 31, 1948, Serial No. 68,654

1 Claim. (Cl. 77—69)

This invention relates to a circle cutter.

It is an object of the present invention to provide an adjustable circle cutter comprising a shank and a member having laterally extending arms for receiving a cutting tool and wherein there is a plurality of openings therein for receiving the cutting tool so that the cutting tool can be located at different distances from the center point whereby to cut different size circles.

Other objects of the present invention are to provide a circle cutter adapted for use with drill presses or the like machines which is of simple construction, inexpensive to manufacture, easy to adjust, durable and efficient in operation.

For other objects and for a better understanding of the invention, reference may be had to the following detailed description taken in connection with the accompanying drawing, in which Fig. 1 is a perspective view of the circle cutter embodying the features of the present invention.

Fig. 2 is a side elevational view of the circle cutter with portions broken away to show the interior construction thereof.

Fig. 3 is a bottom plan view of the cutter bar.

Fig. 4 is a vertical sectional view taken on line 4—4 of Fig. 2.

Referring now to the figures, 10 represents a shank adapted to fit a drill press. On the lower end of this shank is a squared portion 11 with a depending projection or centering portion 12 thereon. Adapted to fit over the squared portion 11 of the shank is a cutter bar 13 having a hub 14 in the square opening 15 for receiving the squared portion 11 of the shank 10. Set screws 16 secure the cutter bar to the squared portion 11. These set screws extend through the hub 14. The cutter bar has arms 17 extending outwardly from the hub 14 and in each of these arms is a series of squared openings 18 projecting upwardly from the bottom face of the bar. The upper ends of the openings are threaded to receive a stop screw 19 adjustable therein. A cutting tool 21 may be fitted into the bottom ends of the openings 18 and held against upward displacement by the stop screw 19. This cutting tool element 21 has a cutting edge 22 and is held within the opening by laterally extending set screws 23 and 24 extending respectively against the cutting tool from the opposite sides of the arm. The arms are grooved on their upper faces, as indicated at 25.

With the shank 10 fitted into the drill press and the depending projection 12 in an opening in the material to be cut, a circle will be made upon the shank being rotated so that the cutting tool 21 engages with the sheet material. The size of the circle will depend upon the location of the cutting element 21. A cutting element can be provided in each arm.

While various changes may be made in the detail construction, it shall be understood that such changes shall be within the spirit and scope of the present invention as defined by the appended claim.

Having thus set forth and disclosed the nature of my invention, what is claimed is:

In a circle cutting tool having a shank and a cutter bar provided with a hub portion, the combination of a reduced square depending portion with a centering projection thereon, and the hub portion having a square hole fitting the reduced square depending portion of the shank, set screws normally securing the cutter bar against downward displacement upon said square depending portion of said shank with the centering portion of the latter extending beyond the cutter bar in downward direction, a pair of alined integral arms extending laterally in opposite directions from said hub portion and each arm having an upwardly facing central groove in the upper surface thereof, both arms having a series of holes for receiving cutting elements in the lower ends thereof spaced apart and extending downwardly from the bottoms of the grooves in substantial parallelism with the central axis of said shank and hub portion, an internal thread in the upper portion of each hole in said series, and a threaded adjustable stop normally engaging with the thread in each hole in said series and extending down into the same from the groove in the arm involved and retaining a cutting element in predetermined position in the hole.

ETHELRED J. CHARLES.

REFERENCES CITED

The following references are of record in the file of this patent:

UNITED STATES PATENTS

| Number | Name | Date |
|---|---|---|
| 295,466 | Wallace | Mar. 18, 1884 |
| 438,230 | Erd | Oct. 14, 1890 |
| 703,538 | Cartwright | July 1, 1902 |
| 879,291 | Meinen | Feb. 18, 1908 |
| 959,475 | Davis | May 31, 1910 |
| 1,049,455 | Clarkson | Jan. 7, 1913 |
| 1,383,707 | Farnum | July 5, 1921 |
| 1,467,430 | Hurd | Sept. 11, 1923 |
| 1,584,308 | Konik | May 11, 1926 |
| 2,338,626 | Emrick | Jan. 4, 1944 |
| 2,413,452 | Kaiser | Dec. 31, 1946 |

FOREIGN PATENTS

| Number | Country | Date |
|---|---|---|
| 2,537 | Great Britain | July 15, 1875 |